Dec. 22, 1970   E. T. ARMSTRONG   3,549,455
APPARATUS FOR MAKING REINFORCED SHEET MATERIAL
Filed Oct. 5, 1967   5 Sheets-Sheet 1

INVENTOR.
EDWARD T. ARMSTRONG
BY
Oldham & Oldham
ATTORNEYS.

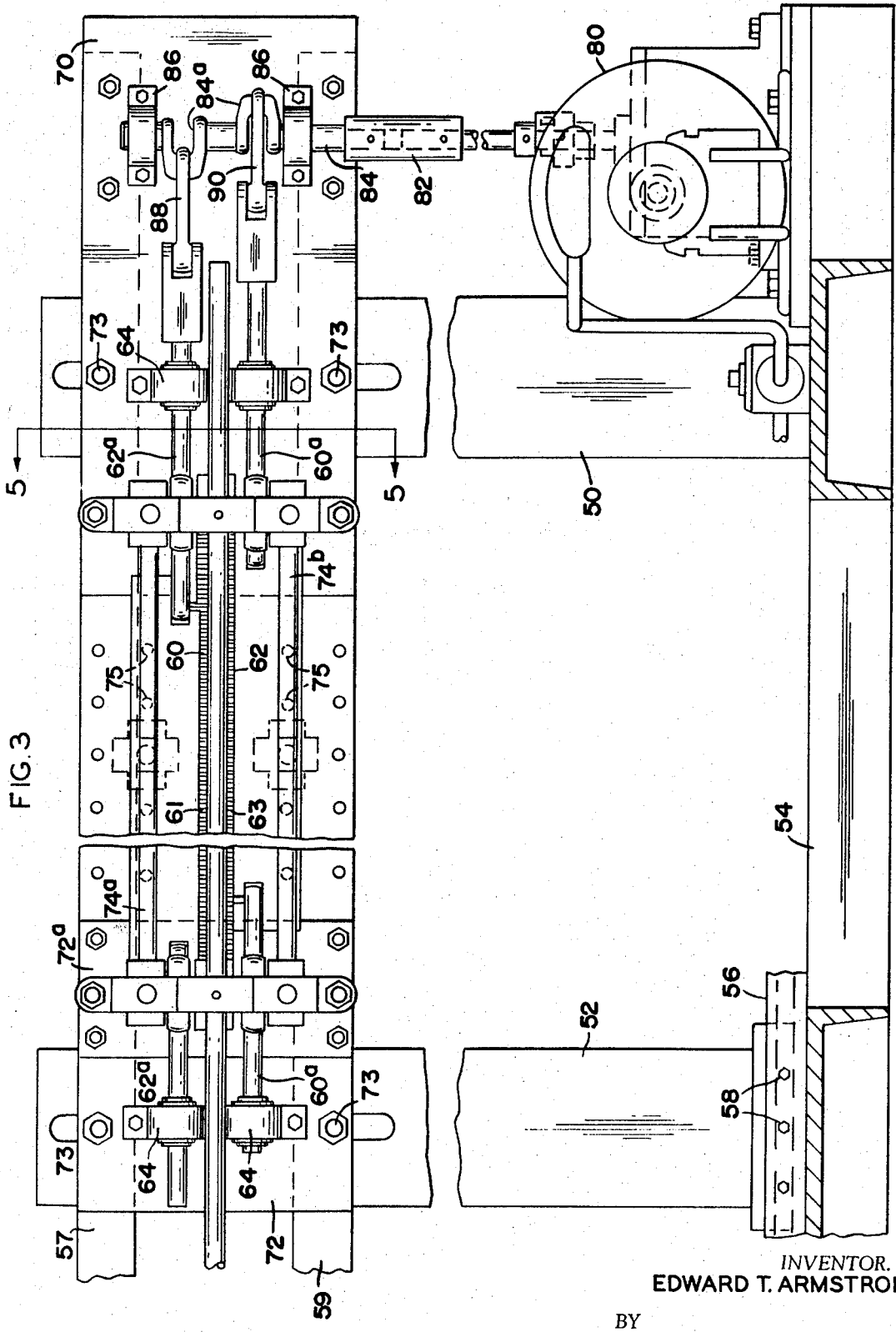

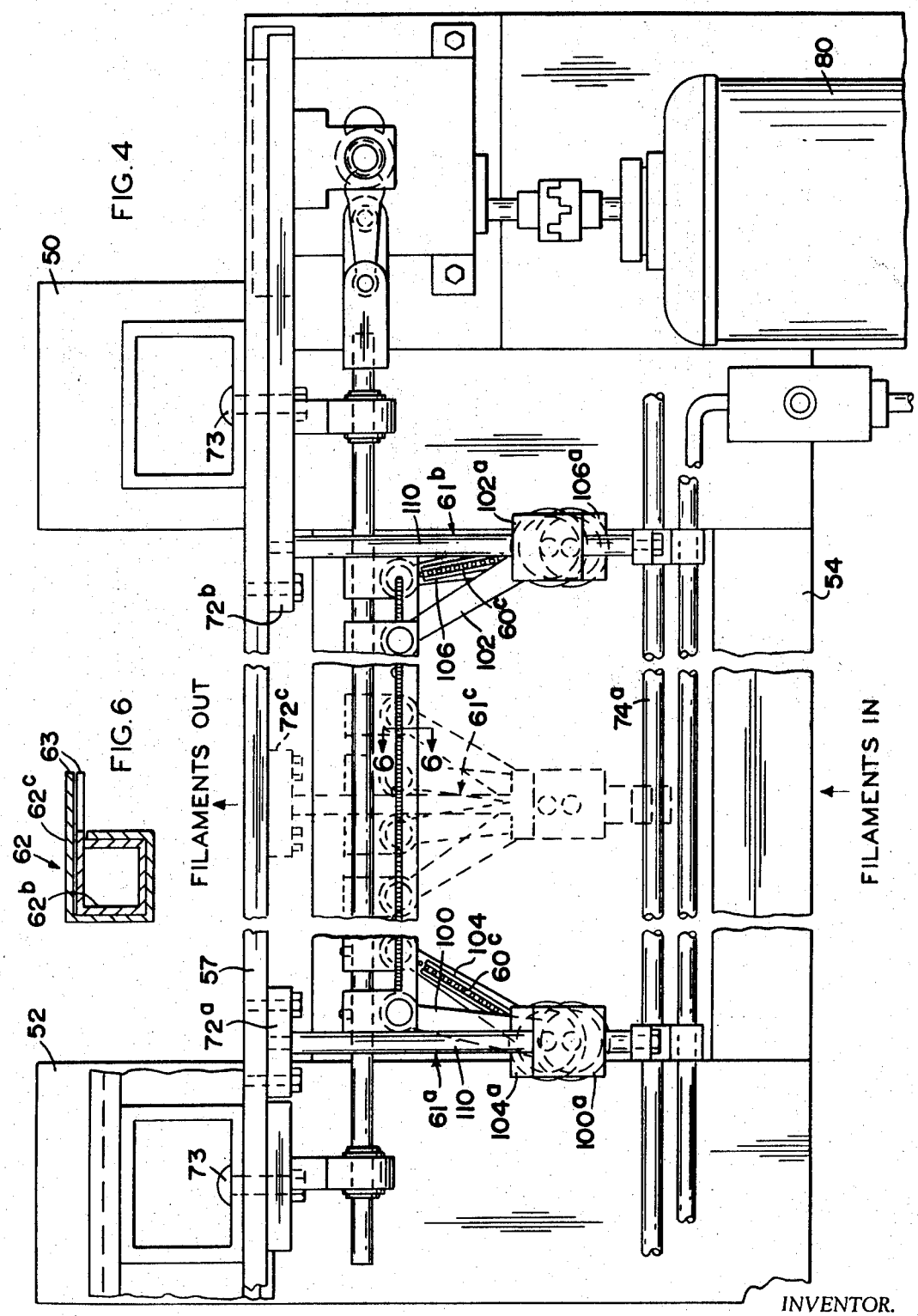

Dec. 22, 1970    E. T. ARMSTRONG    3,549,455
APPARATUS FOR MAKING REINFORCED SHEET MATERIAL
Filed Oct. 5, 1967    5 Sheets-Sheet 4

INVENTOR.
EDWARD T. ARMSTRONG
BY
*Oldham & Oldham*
ATTORNEYS.

INVENTOR.
EDWARD T. ARMSTRONG
BY
Oldham & Oldham
ATTORNEYS.

United States Patent Office 3,549,455
Patented Dec. 22, 1970

1

3,549,455
APPARATUS FOR MAKING REINFORCED
SHEET MATERIAL
Edward T. Armstrong, 490 Pepperidge Tree Terrace,
Smoke Rise, Butler, N.J.
Filed Oct. 5, 1967, Ser. No. 673,164
Int. Cl. D04h 3/05
U.S. Cl. 156—440       13 Claims

ABSTRACT OF THE DISCLOSURE

Apparatus and method for making scrim which alternately reciprocates parallel spaced combs within the edges of the scrim as yarns are fed to and withdrawn therefrom which includes articulated combs, comprised of a main comb, and reciprocating edge combs moving in a hyperbolic envelope at the edges thereof, and at intermediate points, if desired, whereby a scrim or reinforced sheet material can be made which has a uniform sinusoidal waveform of the yarns across certain portions thereof and sinusoidal waveform patterns of progressively decreasing amplitude extending from the uniform portion on each side thereof, either toward a slitting point proceeding similarly therefrom to the next uniform portion or to the edge of the scrim as described, and/or a warp reinforcement as described above but either of increased wave length and decreased wave amplitude or linear.

This invention represents an improviment over the general teaching of the art as exemplified by U.S. Pats. Nos. 2,772,993 and 2,772,718 in the use of two main combs driven in reciprocating relationship. It greatly improves upon the operation of the machine and the method by avoiding waste material, and also provides means for simply, controllably, and progressively changing strength to the edge or slitting points of the material, scrim, or reinforced composite sheet, rather than having a large selvage edge such as that formed in Patents Nos. 2,772,993 and 2,772,718 by the use of the pins 32 thereof.

In effect, the improvement in the art is achieved by utilizing auxiliary combs placed at each end of the elongated main combs with the motion of the main comb being linear caused by oscillation or reciprocation thereof. The auxiliary combs operate in a hyperbolic envelope within the web width on which they are deposited. This structure overcomes the problem in the present state of the art which is that significant variations from the sinusoidal motion describing the deposited path of the yarn from a single central comb moving in pure sinusoidal oscillation should be provided at the edges of the material if any progressively varying edge strength is desired in the fabric produced. Therefore, it is impossible to feed the filaments or strands to the weaving apparatus of Patents Nos. 2,772,993 or 2,772,718 from a beam as not exactly the same length of material will always be deposited at each filament location. However, it is possible with the instant apparatus to feed the entire length of the strands deposited by the central combs from beams and only feed the auxiliary combs from pirns. This structural distiction makes the apparatus smaller, less costly, more economical to operate, and far less wasteful of material than is possible by practice of the prior art processes. The distinction makes it possible

2 to control the product strength as desired across the full machine direction so making it uniform, or progressively increasing or decreasing at edges and or intermediate slitting points with auxiliary comb locations, as desired.

The objects of the invention are achieved by providing an apparatus for making scrim and/or a scrim reinforce sheet composite material which includes the combination of the frame, a pair of substantially equal length main combs mounted in spaced parallel sliding relation by the frame, means to feed filaments to the combs from pirns mounted on a creel, and a beam, if desired, and take the filaments away after passing through the combs, means to achieve alternating reciprocating motion of the combs as the filaments are fed to and withdrawn from the combs which is characterized by a separate auxiliary comb pivotally attached from one end thereof at each end of each main comb with the opposite end of each auxiliary comb being mounted in sliding relation to the frame in a direction substantially perpendicular to the sliding direction of the main combs.

For a better understanding of the invention, reference should be had to the accompanying drawings, wherein:

FIG. 3 is a partially broken-away, elevational view of the combs and drive mechanism incorporated in the preferred embodiment of the invention;

FIG. 4 is a partially broken-away, end elevation of the apparatus of FIG. 3 showing in greater detail the specific arrangement between the main combs and the auxiliary combs;

FIG. 6 is an enlarged, cross-sectional illustration of the telescoping arrangement of the main combs taken on lines 6—6 of FIG. 4;

Figure 1:
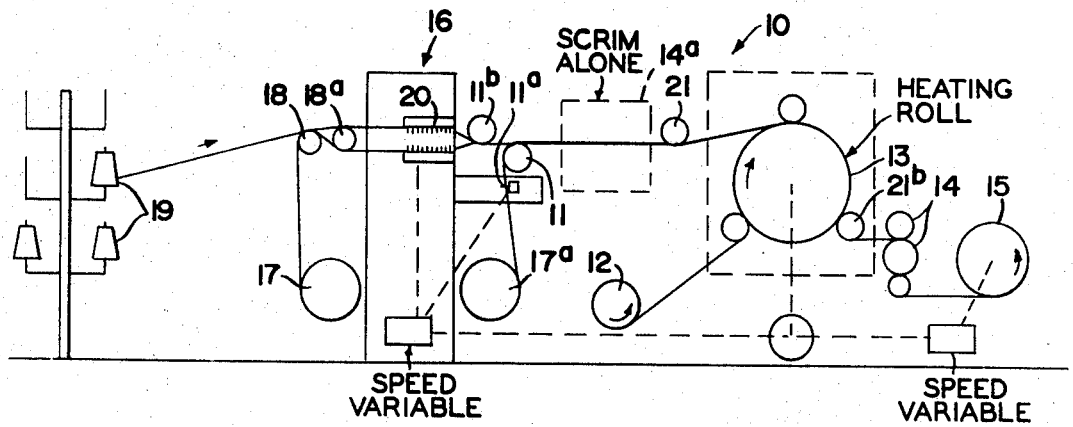
FIG. 1 is a side schematic illustration of the overall apparatus utilized to make reinforced sheet in laminated condition.

With reference to the form of the invention illustrated in the drawings and particularly to the general overall schematic of FIG. 1, the numeral 10 indicates the apparatus as a whole and comprises a film or other sheet material supply roll 12, whereby the material from roll 12 acts as a substrate, associated lay-on roll 13, a pair of laminating rolls 14, a take-up roll 15, and the filament handling mechanism, indicated generally by numeral 16.

The substrate material from roll 12 may be of a class including flat or patterned elastomeric, cellulosic, polymeric, fabric, glass, or metallic, or the like, any of which may be in solid, expanded, foam, or filamental, oriented or randomly disposed forms to allow use of the invention with all forms of substrates. A set of filament carrying pirns, spools, or beams 17 feed the filaments, which might be yarn or roving of: nylon, polyester, fiber glass, cotton, rayon, or any other suitable material, into the mechanism 16 over a guide roll 18 and splitting roll 18a for main combs (not shown in FIG. 1) while a plurality of yarn carrying pirns 19 feed into the mechanism 16 to auxiliary combs 20, to be more fully defined hereinafter.

In some instances it may be desirable to have a warp reinforcement, and to this end a roll 17a feeds warp reinforcing strands over a directing roll 11, through a comb 11a, and then into proper relation with the scrim received out of the mechanism by roller 11b. Note that roller 11b has to be laterally separated from roll 11 to permit yarn or filament movement transversely. The comb 11a may be fixed to feed a straight warp, or it may be reciprocated with a small amplitude, long wave length oscillation with articulated combs of substantially the same construction as for the mechanism 16, all of which is described more fully hereinafter.

Figure 2:
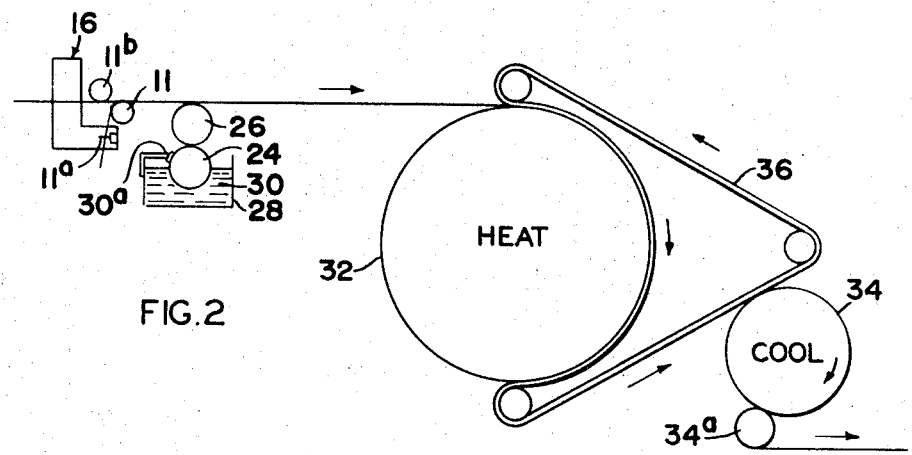
FIG. 2 is a schematic, enlarged illustration showing how scrim or reinforced material without any lamination can be made.

The invention contemplates that adhesive or binder material may be applied directly after the warp is introduced as indicated by dotted block 14a. The working components of block 14a are shown in FIG. 2 and will be more fully explained hereinafter. Alternatively, according to the desired end product, a web may be introduced from roll 12 in a processing state characterized by a tacky adhesive surface, or a suitable heat-activated adhesive or binder might be coated on the web from roll 12. Alternatively, an emulsion, solution, or plastisol binder may be applied there or directly to the scrim within block 14a as described later. The formed strands or filaments coming through mechanism 16 are called the fill, and may be combined with warp from roll 17a, or may be passed alone under lay-on roller 21 and around drum 13. Since the web from roll 12 also passes around drum 13, the strands or filaments are bonded into position on the adhesively characterized web surface which is then wound onto take-up roll 15. A pick-off roll 21b feeds the web and filament combination to the bite or nip of the laminating rolls 14 before it is led to the take-off roll 15. The bite described is unnecessary in certain reinforced substrate composites which have enough stiffness to pay out themselves.

FIG. 2 illustrates an embodiment of the invention modified from that shown in FIG. 1 in which the scrim or reinforced sheet material is formed without the lamination of any sheets thereon. In this instance, the formed filaments or strands coming from mechanism 16 and a warp fill are passed over an adhesive applying roller 26, which contacts an engraved roller 24, whereby roller 24 dips continuously into a tank 28 containing a suitable solution, emulsion, organosol, or plastisol adhesive or thermosetting type material 30, or the like. A doctor blade 30a in conjunction with the selected mill engraved applicator 30b controls the thickness of the adhesive coating. Independent deposit thickness control may be achieved by speed regulation of roller 26, an offset roll, or the engraved roll 24. Thus, the scrim is coated with the material 30 as it passes over roll 26. The scrim is then passed around a drum 32 which is heated by any suitable means, however, preferably by condensing steam, and from there passes around a cooling roll 34 and a take-off roll 34a before progressing in the direction indicated by the arrows to a suitable take-up roll. In this manner an unlaminated bonded scrim can be manufactured with a tremendous reduction in the amount of adhesive binder required and a marked reduction in the total material required to form the scrim owing to the reduction in waste scrap and edge trim.

It is preferable for the purposes of the invention that the heating and cooling drums be Teflon covered, and that belt 36 be a permeable Teflon coated belt. Also, with respect to FIG. 2, it should be understood that the applicator roll 26 has provision for speed regulation whereby the quantity deposited is independently controlled by a combination of roll speed and setting of the blade 30a, in conjunction with a selected mill engraving applicator roll 24.

FILAMENT HANDLING MECHANISM

Figure 5:
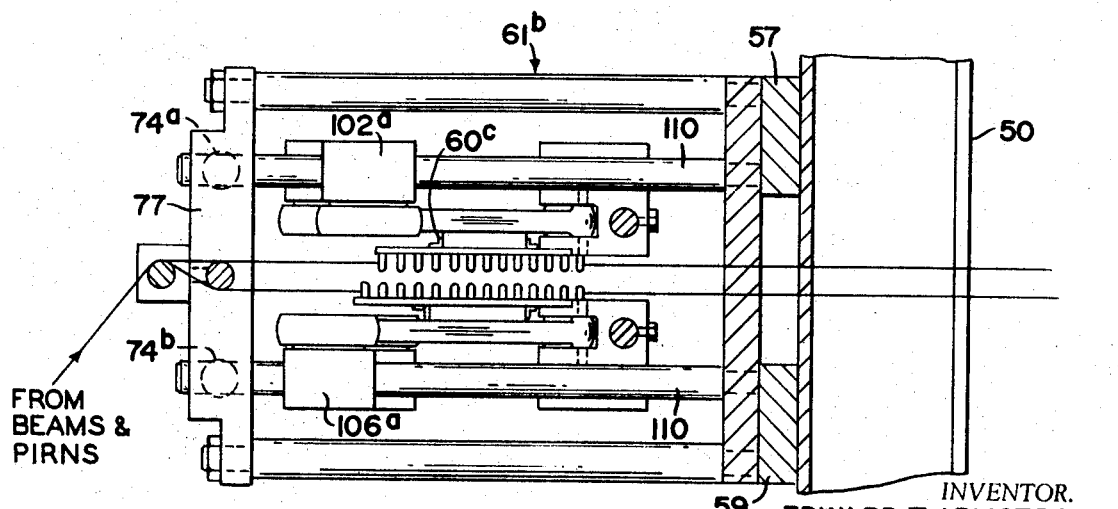
FIG. 5 is an enlarged, vertical, cross-sectional illustration showing the sliding relationship of the auxiliary combs in transverse direction to the sliding relationship of the main combs as taken on line 5—5 of FIG. 3.

The essence of the invention is achieved by the filament handling mechanism indicated generally by numeral 16 in FIGS. 1 and 2. In order to support the mechanism 16, a pair of vertically directed stanchions 50 and 52 are provided with stanchion 50 being fixedly mounted to a U-shaped channeled base frame 54. However, certain objects of the invention may be achieved by having stanchion 52 being laterally slidably mounted to base frame 54 by being carried in a dovetailed or T-slot slide 56. Appropriate locking bolts 58 are received through slide 56 to lock stanchion 52 in a selected position thereon. Normally, however, stanchion 52 is locked at maximum width, and a subframe 72a supporting the auxiliary combs on that end is adjustably mounted with relation to the horizontally extending support bars 57 and 59. The bars 57 and 59 are mounted to the stanchions 50 and 52. Thus, the horizontal adjustability of sub-frame 72a on bars 57 and 59, in combination with a telescopic action of the main combs 60 and 62, to be more fully defined hereinafter, provides control of count and width of the material or scrim, laminated or unlaminated, that is made by the apparatus and method of the invention. The sub-frame 72a and sub-frames 72b and 72c, shown in dotted lines of FIG. 4, each mounts a sub-assembly indicated generally by numerals 61a, 61b, and 61c, respectively, which carry rods, sliding blocks and auxiliary combs or reeds. Each of sub-frames 72a, 72b, and 72c are positionable at any lateral point on bars 57 and 59 to provide selective width and trim points for the material formed thereby. The activation of the auxiliary comb simply requires insertion-removal of the comb section 60c, as best seen in FIG. 5, at any such point from or to main combs or auxiliary comb carrier. In other words, for the centrally positioned auxiliary combs, that portion of the main comb in conflict therewith should be removed. Likewise, when the auxiliary comb is not in use, its comb section 60c may be removed and that corresponding section of the main comb replaced. The apparatus of the invention can form an integrated wave form pattern comprised of single or multiple strands or elements.

Figure 7:
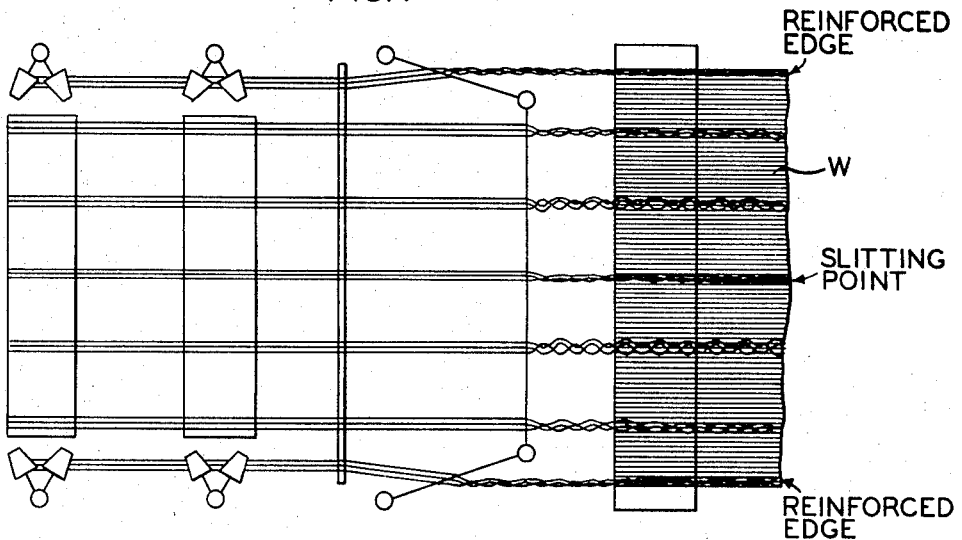
FIG. 7 is a plan view of the apparatus showing how the main combs are fed from beams and the auxiliary combs are fed from pirns.
Figure 8:
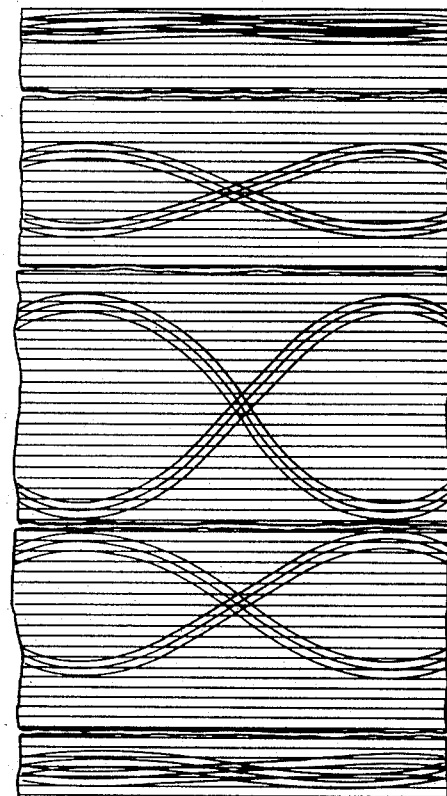
FIG. 8 is an enlarged, broken-away plan view of the reinforced material made by the method and apparatus of the invention.

The formation of the filaments in the sheet material of the invention is illustrated in FIG. 7 of the drawings. This may be formed either with web material from rolls 12 in a laminated relationship or simply as a scrim of yarns or filaments with the yarns or filaments extending longitudinally and transversely to form interrelated sinusoidal shaped pattern as best seen in FIG. 8. Note, however, the equal wave length varying concentration and amplitude reduction of the sinusoidal pattern toward each edge or slitting point of the material. Note the warp W which has a sinusoidal pattern of greater wave length and less amplitude. This type of scrim material pattern is formed from the apparatus of the invention as defined below.

Essentially, the mechanism 16 comprises a pair of substantially parallel, but spaced main combs 60 and 62 which are slidably carried in appropriate bearing housings 64 mounted to respective top plates 70 and 72. The plates 70 and 72 are slidable vertical adjustment by bolts 73 received in the respective stanchions 50 and 52. In effect, the sliding actions of the combs 60 and 62 are achieved by mounting them to appropriate rods 60a and 62a which are slidably received in respective bearing housings 64. Thus, in effect, the combs 60 and 62 are slidable in a horizontal plane or substantially transversely to the stanchions 50 and 52. The objects of the invention are achieved by providing the combs 60 and 62 with an alternating linear reciprocating motion to achieve the desired formation of the filaments or yarns passing therethrough into a sinusoidal or modified sinusoidal, reinforced scrim pattern. In the usual manner, the combs 60 and 62 have opposed teeth 61 and 63, respectively, which perform the guide requirements for the filaments or strands fed thereto and engaged thereby. Preferably the combs 60 and 62 are removably mounted to rods 60a and 62a so the entire comb or short sections in appropriate positions can be removed and replaced with combs 60c on intermediately positioned articulated members as in FIG. 5.

Figure 9:
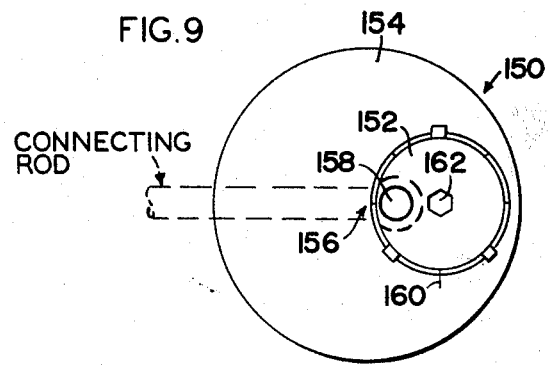
FIG. 9 is a plan view of an adjustable eccentric drive member for the reciprocating combs.
Figure 10:
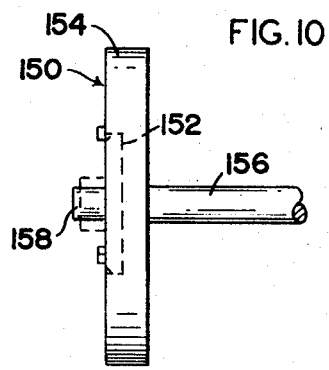
FIG. 10 is a side view of the eccentric drive member.
Figure 11:
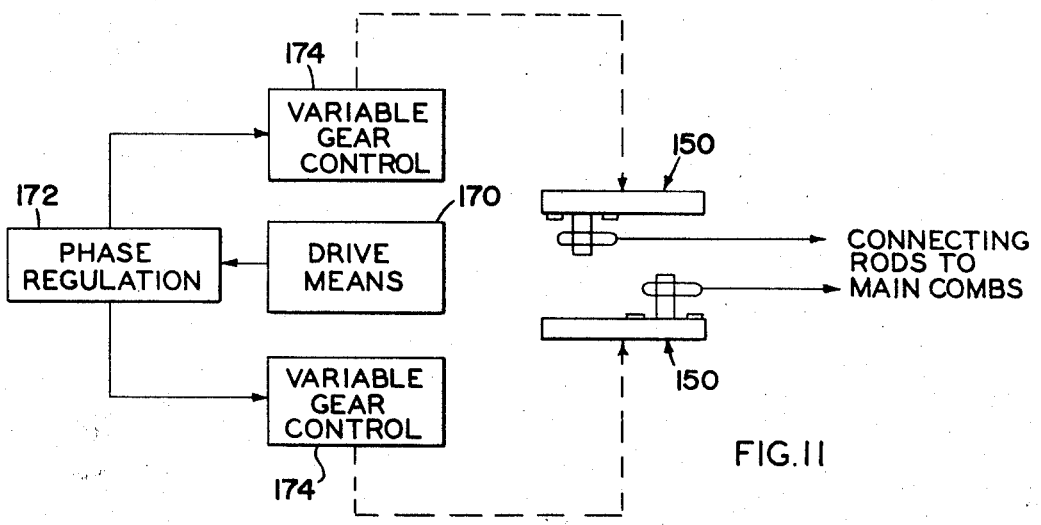
FIG. 11 is a schematic illustration of a variable registry gear control for a pair of eccentric drive members.

The reciprocation is achieved by a drive motor 80 feeding through a flexible coupling 82 to drive a crank shaft 84. The crank shaft 84 is rotatably mounted by brackets 86 to plate 70 and connecting rods 88 and 90, respectively, connected between the eccentric off-sets 84a of shaft 84 and the ends of rods 60a and 62a, respectively, in a conventional manner. The motor 80 will normally drive through a reduction gear and, of course, the adjustment thereof can be selectively chosen to control the speed of reciprocation of combs 60 and 62, thereby in combination with the speed of the filaments through the combs controlling the wave length thereof. The eccentric off-sets in crankshaft 84 are substantially 180° apart so as to achieve a true alternating reciprocation of the combs 60 and 62, respectively. However, the amplitude, wave length and/or phase angle of this pattern may be modified continuously over a broad range. This is done by substituting separate, various radius and adjustably phased cranks having an independent speed regulation. A suitable eccentrically adjustable drive member, indicated generally by numeral 150, is shown in FIGS. 9 and 10. Specifically, a circular plate 152 is received in recessed relation in a drive base 154. The base 154 is rotated on its axis 156. A pin 158 is fixed to plate 152 to provide an eccentric drive arm. Rotation of plate 152 to set it at a particular angular relation to scribe mark 160 may be accomplished by a recessed hex opening 162.

Figure 12:
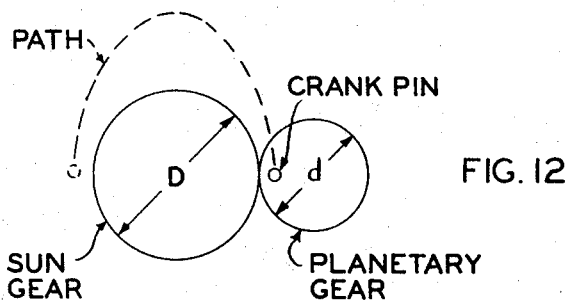
FIG. 12 is a schematic illustration of a modified gear control.

In addition, variations from sinusoidal motion may be desirable and can be accomplished, as shown in FIG. 12, by positioning the crank pin on an elliptical gear or on a planetary gear. In a planetary pair, use of a diameter ratio, $D/d$, of 2 is particularly useful in permitting high speed large amplitude non-sinusoidal motion with low accelerations and consequently reduced forces. The path of this pin is an epicyclic in comparison iwth the circular paths of a fixed radius pin. Typical controls are shown in FG. 11. Here a drive means 170 drives through phase regulation gearing 172 which in turn actuates respective variable gear controls 174. Each control 174 drives a respective drive member 150. Preferably this set up is mechanical, but it can work through appropriate electrical controls, servos, etc.

It should be understood that the combs 60 and 62 each contain opposed substantially vertically directed teeth, or similar means 61 and 63, respectively, through which the filaments or yarns pass during the formation of the scrim or reinforced sheet material, all in the usual manner of the scrim forming art. While the invention describes combs, however, in certain circumstances reeds may be just as satisfactory to achieve the objects of the invention.

The characterizing features of the invention are achieved by mounting laterally positionally adjustable auxiliary combs to one end of the main combs and a principal similar, non-laterally adjustable auxiliary comb at the drive end of the main comb, and readily removable combs at any intermediate slitting points for the material formed. Corresponding removable elements are introduced in the main comb. Specifically, and as best seen in FIG. 4 of the drawings, auxiliary combs 100 and 102 are pivotally mounted to each end of the top comb 62, while auxiliary combs 104 and 106, respectively, are mounted to the opposite ends of comb 60. The dotted line indications of FIG. 4 show the central position of auxiliary combs in reciprocal relation to make the filament area of reduced amplitude and possible increased filament concentration come together adjacent the slitting point. Each of the connections of the respective auxiliary combs to their respective ends or central portions of the main combs are pivotal mountings with appropriate pins. The opposite end of each respective auxiliary comb is pivotally carried in a respective block, indicated by the auxiliary comb member and sub-letter a with the blocks slidable on bars 110. The bars 110 are a precision part of subassemblies indicated generally by numerals 61a and 61b, respectively, which subassemblies when mounted to sub-frames 72a and 72b are positionable laterally with respect to the frames 70 and 72 on bars 57 and 59, thus also providing compensating motion for the telescopic relation of the main reeds or combs 60 and 62. Rods 74a and 74b connect between the ends of bars 110 and have precision holes 75 along their lengths to receive the ends of all intermediate bars 110 so that a connecting bracket 77, associated with subassembly 61a, as seen in FIG. 5, is not necessary to interfere with the scrim being formed. This lateral positional capability eliminates the necessity of sliding the entire post 52. The removable comb elements simplify trimming the process, i.e., generating any desired width from the maximum to lesser magnitudes and also introducing or removing intermediate trimming points. For example, a 120″ process may make any lesser full width or two 60″ widths, three 40″ widths, etc., subsequently trimmed and uniformly edge reinforced symmetrically.

It can thus be seen clearly in FIG. 4 that the auxiliary combs tend to pivot at both their ends upon the reciprocation of their main combs to move from a somewhat perpendicular relationship to the main comb when the main comb is at one end of its reciprocation to a more obtuse angular relationship with respect to the main comb at the other end of the reciprocation. The invention contemplates that the obtuse angular relationship might be anywhere from approximately 45° to about 75°, and that the perpendicular relationship limiting the hyperbolic envelope should not be perpendicular to avoid possible locking up, but can vary from 15° to about 30° from the perpendicular relationship, dependent upon the degree of strengthening required for the edge or slitting point. Each of the auxiliary combs has respective teeth which extend in opposed relationship on substantially the same plane as the teeth of the main combs so that the yarns or filaments from the pirns 19 of FIG. 1 will lie in substantially the same horizontal plane as they pass through the respective teeth of the auxiliary combs and on through the rest of the apparatus to the take-up roll.

Therefore, it should be understood that the yarns or filaments, extending from the beams 17 pass through their respective teeth on the respective main combs and onto the take-up roll, and the filaments and yarns from pirns 19 pass to the respective teeth on their respective auxiliary combs, and then on to the take-up roll 15, as clearly shown in FIG. 7. Thus, upon the rotational operation of the take-up roll 15, and the reciprocating action of the main combs by motor 80, a substantially constant sinusoidal path will be defined for those filaments passing through the main combs while the sinusoidal path for those filaments passing through the auxiliary combs will vary in amplitude as the auxiliary combs define a substantially hyperbolic path upon the reciprocation of the main combs. Also, of course, a suitable reciprocating structure is incorporated into the mechanism 16a mounting comb 11a similar to that incorporated into mechanism 16 to effect some linear movement to the reinforcing warp, so generating sinusoidal patterns varying in amplitude from zero to perhaps 1/10 that of the main filling combs, as selectively desired. This will achieve the production of a scrim or reinforced sheet material of substantially constant strength characteristics across the central part thereof and variable filament concentration and strength changing gradually and symmetrically, if desired, from the limiting point defined by the auxiliary combs to the slitting points or out to the edges of the material. The material of the invention as shown in FIGS. 7 and 8 exhibits these quantities.

As a feature of the invention and in order to simplify process trim and construction as well as to eliminate material waste, all main combs are made with the removable sections described and may be provided in duplicate, being telescopic with relation to each other, so that the filament count of the fabricated material may be controlled thereby and be readily varied. Specifically, FIG. 6 illustrates that comb 62 has an inner housing 62b which is slidable with respect to the outer housing 62c. Note how the teeth 63 for comb 62 are carried by both the inner and outer housing and by controlling the telescopic relation of sections 62b and 62c, these teeth may be aligned to receive the filaments from the respective beam at variable beam at variable counts per inch. For example, consider two combs 10 per inch, aligned, give a gap spacing of 10 per inch. If shifted ½ pitch, spacing is then 20 per inch. Product count can then be set corresponding to integral spacings in 20th's of an inch.

Therefore, in this manner the apparatus of the invention can be adjusted to provide a scrim or reinforced sheet material which is of a specific width desired from a maximum to lesser values with or without intermediate trim points conveniently changeable without waste, rather than having to make the material to a maximum fixed width, and to cut off that in excess of the width desired, and of any desired count, amplitude, phase angle, wave length and substrate characterized by either sinusoidal or non-sinusoidal waveform, as preferred.

SUMMARY

Thus, it is seen that the objects of the invention are achieved by utilizing auxiliary combs in combination with reciprocating main combs. It could be said that the top and bottom combs for filling and the warp comb are articulated by having the auxiliary combs connected thereto wherein the travel in the cross-machine direction by the articulated combs is always confined within the region in which scrim lay-down is desired. Moreover, this equipment and the process performed thereby will produce scrim alone without any web or substrate, as pointed out in the description for the modification of FIG. 2 of the drawings. The use of a compact beam for supply of filaments to the main combs reduces the size of the apparatus by eliminating extensive creels for pirn fed yarn. Further, the ability to adjust the width of full or trimmed product without at all affecting the main frame and bearings is achieved by moving only the outboard auxiliary articulated combs at one end of the main combs to compensate for the width of the fabric. The addition of single or multiple webs of material such as solid or extended foil, elastomers, plastic, paper, fiber glass, oriented or randomly arranged, with or without appropriate adhesives, weaves, fabrics, felted textile type substrates, or combinations thereof can easily be accomplished in the usual manner as shown in FIG. 1, in line or sequentially. This would cover polyethylene-polyethylene, as well as polyethylene in combination with any other substrate, for example.

It should be realized that the longitudinally extending reinforcing warp strands fed by mechanism 16a will normally be at a markedly reduced wave amplitude, or may be straight without oscillation. Of course, any combination of multiple webs, single webs, sheet, or film from the rolls 12 may be used with the apparatus shown in FIG. 1; although no web is necessary to the operation. Also, in some instances, only one set of articulated oscillating comb may be provided, for example, centrally, with the principal end located auxiliary combs of the invention, or multiple sets of intermediate articulated combs may be positioned to provide for slitting points.

While in accordance with the patent statutes, only one best known embodiment of the invention has been illustrated and described in detail, it is to be understood that the invention is not limited thereto or thereby, but that the inventive scope is defined in the appended claims.

What is claimed is:

1. In an apparatus for making scrim, the combination of a frame, a plurality of substantially equal length main combs mounted in spaced parallel sliding relation by the frame, means to feed filaments to the combs and take the filaments away after passing through the combs, means to achieve alternating reciprocating motion of the combs confined within the extreme width of the scrim generated as the filaments are fed to and withdrawn from the combs which is characterized by a separate auxiliary comb pivotally attached from one end thereof at each end of each main comb with the opposite end of each auxiliary comb being mounted in sliding relation on the frame for movement in a direction substantially perpendicular to the sliding direction of the main combs, and lying in substantially the same plane as the filaments taken away from the comb all disposed within the width of the scrim formed.

2. An apparatus according to claim 1 wherein beams are provided to feed the filaments to the main combs, and pirns are provided to feed the filaments to the auxiliary combs, and at least one continuous substrate web is moved into adjacent relation to the filaments passing through the combs, and means to laminate the web to the filaments.

3. Apparatus, according to claim 1, where means are provided to coat the filaments with a bonding material after they pass through the combs, means are provided to hold the filaments in relation to each other after they pass through the comb and are coated with the bonding material, and means to cure the bonding material as the filaments are held in relation to each other thereby bonding the filaments to each other at any points of intersection.

4. Apparatus according to claim 1 where the bonding material deposit is controllable independently by a selected mill engraved roller-blade pressure combination and by speed regulation of an offset engraved applicator roll.

5. An apparatus according to claim 3 wherein the filaments coated with the bonding material are passed around a heated drum which includes an endless vapor-permeable belt having a portion thereof in engagement across the entire width of the surface of the drum and over a substantial portion of the circumference thereof, and adapted to move with the surface of the drum upon rotation thereof, and means to rotate the drum so as to pass the filaments therearound between the outer surface of the drum and the endless belt.

6. An apparatus according to claim 1 wherein the main combs have removable elements and are telescopic and at least one auxiliary comb group is positionable so that the width of the material formed by the apparatus may be controlled by the preselected, removable sections, and the positional and telescopic relationship of the auxiliary and main combs, respectively.

7. The combination of claim 6 wherein the means to achieve alternating reciprocating motion of the main combs are adjustable to control the amplitudes and phase of reciprocation of the main combs.

8. The combination of claim 5 wherein the motion of the main combs is nearly sinusoidal and driven by a crankshaft slider mechanism.

9. A combination according to claim 5 wherein the motion of the main combs is non-sinusoidal and driven by a crank pin located on a planetary gear rotating about and meshing with a sun gear having a diameter ration, $D/d$, of 2.

10. A combination according to claim 6 where the main combs are divided into sections, and these sections as well as the auxiliary combs are removably mounted to permanently positioned carriers supported by the frame.

11. A combination according to claim 1 which includes means to introduce a superimposed filament pattern of reduced amplitude and much greater wave length comprising a warp-like reinforcement bonded to the filaments at all points where there is contact.

12. A combination according to claim 11 which includes means to provide at least one continuous substrate bonded to all the filaments.

13. In an apparatus for making scrim the combination of a frame, a main comb mounted in substantially horizontal sliding relation by the frame, means to feed filaments to the comb and take the filaments away after passing through the comb, means to achieve a reciprocating motion of the comb as the filaments are fed to and withdrawn from the comb which is characterized by at least one separate auxiliary comb pivotally attached at one end thereof at a selected location on the main comb with the opposite end of each auxiliary comb being mounted in sliding relation on the frame for sliding movement in a direction substantially perpendicular to the sliding direction of the main comb, and lying in substantially the same plane as the filaments passing through the main comb.

References Cited

UNITED STATES PATENTS

| | | | |
|---|---|---|---|
| 3,053,717 | 9/1962 | Bright | 156—440 |
| 3,095,338 | 6/1963 | Romann | 156—441 |

CARL D. QUARFORTH, Primary Examiner

B. H. HUNT, Assistant Examiner

U.S. Cl. X.R.

156—435, 437, 441